United States Patent
Franco et al.

[15] 3,694,506
[45] Sept. 26, 1972

[54] PROCESS FOR PREPARING N-(2-CARBOXAMIDOETHYL) ACRYLAMIDE

[72] Inventors: Simone Franco; Alvaro Leoni, both of Ferrania/Cairo Montenotte; Manlio Marini, Savona, all of Italy

[73] Assignee: Ferrania, S.P.A., Milano, Italy

[22] Filed: Feb. 17, 1969

[21] Appl. No.: 813,363

Related U.S. Application Data

[62] Division of Ser. No. 585,735, Oct. 11, 1966, abandoned.

[30] Foreign Application Priority Data

Oct. 23, 1965 Italy...............................24353

[52] U.S. Cl............260/561 N, 260/561 A, 260/89.7, 260/561 K

[51] Int. Cl............................................C07c 103/00
[58] Field of Search...........260/561 K, 561 N, 561 A

[56] References Cited

FOREIGN PATENTS OR APPLICATIONS 41,212   1/1965   Japan.........................260/561

Primary Examiner—Lewis Gotts
Assistant Examiner—Ethel G. Love
Attorney—Kinney, Alexander, Sell, Steldt and Delahunt and James A. Smith

[57] ABSTRACT

This invention relates to a new and efficient process for the preparation of N-(2-carboxamidoethyl) acrylamide and polymers thereof. In general the polymeric products of this invention are relatively high molecular weight polymers.

12 Claims, No Drawings

A PROCESS FOR PREPARING N-(2-CARBOXAMIDOETHYL) ACRYLAMIDE

This application is a division of application, Ser. No. 585,735, filed Oct. 11, 1966, now abandoned.

It is well known that acrylamide can be polymerized by a free radical process and by a base-catalyzed process, the former leading to a polymer having the recurring unit

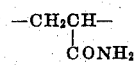

and the latter leading to polymers with recurring beta-alanine units

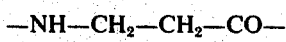

Breslow (JACS 79, 3760–3763, 1957), in his basic work on the polymerization of acrylamide to poly-beta-alanine, recognized among the reaction products an acrylamide "dimer" to which, based on some analytical data, he assigned the formula

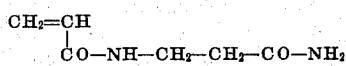

Breslow also found that this dimer could be polymerized by the base-catalyzed process, in a manner similar to acrylamide. The resulting polymer would thus contain recurring units of

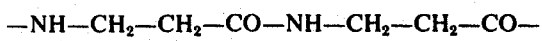

which is essentially base polymerized polyacrylamide

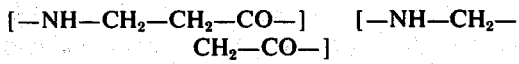

It has now been found that it is possible to produce N-(2-carboxamidoethyl) acrylamide in high yields, i.e. up to 45 – 50 percent, from acrylamide by regulating the reaction conditions, such as temperature, catalyst, solvent, concentration, reaction time, etc. As a result it now becomes feasible to prepare polymers of N-(2-carboxamidoethyl) acrylamide by free radical polymerization to produce relatively high molecular weight homopolymers or copolymers thereof with other ethylenically unsaturated, free radical polymerizable monomers, the resulting polymer containing recurring units of the formula

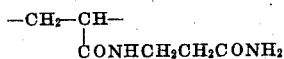

The preparation of N-(2-carboxamidoethyl) acrylamide in high yields is carried out by employing special catalysts of the class consisting of metallo-alkyls, e.g. butyllithium; ketometallic complexes, e.g. the complexes of complexable ketones such as benzophenone with alkali metals (preferably with Li and K); and metallo-aryls, e.g. lithium-naphthalene. Said catalysts may be employed in varying amounts according to the other reaction parameters, such as temperature, reaction time, and monomer concentration, being preferably employed in amounts ranging from 0.005 to 0.05 mol per mol of acrylamide.

The concentration of monomer can range within wide limits; however, concentrations around 10-15 percent by weight in the solvent media have proven to be useful. The reaction is carried out in the usual inert organic solvents, (ethers such as dioxane and tetrahydrofuran being preferred), at temperatures in the range of from 32.0° to 212° F. (0°–100° C.), for times ranging from 10 minutes to 48 hours. It has been found particularly advantageous to carry out the reaction in dioxane, since the dimer is fairly soluble in hot dioxane but relatively insoluble in cold dioxane. The different reaction parameters are closely related and are suitably selected to provide a high yield of N-(2-carboxamidoethyl) acrylamide. Therefore, at the higher temperatures, lower reaction times are preferred. In fact, it appears that the reaction proceeds through subsequent stages, and it is preferable, after having selected a reaction temperature, to carefully control the reaction time so as to stop the reaction when a high concentration of the desired product has been reached, thereby preventing the formation of undesirable polymeric products. By carrying out the reaction in this way with a suitable solvent and catalyst, for example dioxane and butyllithium, in the concentrations hereinabove set forth, at 140° F. (60° C.), it is observed that by stopping the reaction after 10–15 minutes, there is obtained a dimer yield of 30–35 percent; by extending the reaction time to 10 hours, the dimer yield drops to less than 10 percent. The dimer yield can be raised to 45–50 percent without careful control of the time-temperature factors by carrying out the reaction with the abovedescribed system at room temperature for 24–30 hours. In this particularly preferred case, the product, which is only slightly soluble in dioxane at these conditions, separates from the reaction medium, thereby reducing the possibility of its polymerization and increasing its purity.

In the reactions herein disclosed, beside the desired N-(2-carboxamidoethyl) acrylamide, other oligomers and low molecular weight poly-beta-alanines can be formed. By carrying out the reaction in hot dioxane, in which the oligomers higher than the acrylamide dimer and the low molecular weight poly-beta-alanine are insoluble, by filtering the hot reaction mixture the N-(2-carboxamidoethyl) acrylamide or acrylamide dimer, which slowly crystallizes out in relatively pure form by slow cooling of the filtrate, is easily recovered and separated from the other by-products. The yield is around 30–35 percent calculated on the acrylamide reactant.

When the reaction is conducted at room temperature, the yield of dimer rises to 40–45 percent. By filtering the reaction mixture there is obtained a blend of dimer, other oligomers and low molecular weight poly-beta-alanine, from which the dimer can be easily recovered by extraction with hot dioxane.

The N-(2-carboxamidoethyl) acrylamide polymerizes and copolymerizes in the presence of free-radical catalysts with other free radical polymerizable monomers, giving products having a comparatively high molecular weight and comprising wholly or partly recurring units of the structure:

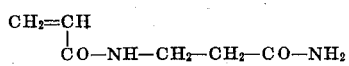

The polymerization can be carried out in the usual solvents, such as water, methanol, dioxane, dimethylformamide, etc. by employing any of the usual free-radical yielding catalysts, such as potassium persulfate (with or without bisulfite as promoter), organic peroxides, hydrogen peroxide, hydroperoxides, azo catalysts, at temperatures ranging from room temperature to 212° F. (100° C.).

Ultra-violet radiation polymerization of N-(2-carboxamidoethyl) acrylamide in methanol at room temperature can be carried out with azo-bis-isobutyronitrile or 4,4'-azo-bis-cyanopentanoic acid as catalysts. Copolymerization may also be conducted in refluxing methanol with the same catalysts.

Suitable comonomers which may be copolymerized with N-(2-carboxamidoethyl) acrylamide include acrylamide, methacrylamide, vinyl acetate, acrylic and methacrylic acids, acrylate esters, vinyl pyrrolidone, vinyl oxazolidone, maleimide, acryloylpyrrolidone, acryloylcaprolactam, styrene potassium sulfonate, etc.

The following examples are of use to illustrate more specifically what has been hereinabove set forth, without in any way limiting the scope of the invention.

EXAMPLE 1

In a three-liter, one-necked flask 300 g. of acrylamide, freshly recrystallized from chloroform and thoroughly dry, and 2,400 ml. of dry dioxane were introduced. While vigorously stirring with an electromagnetic stirrer, there were added at room temperature 75 ml. of butyllithium (as a 1.6 M solution in n-hexane) under an atmosphere of pure, dry nitrogen. The flask was thoroughly sealed, and the contents were heated for 15 minutes at 140° F. (60° C.). The solid which formed was filtered under vacuum while hot.

The filtrate was left standing for 24 hours, and the N-(2-carboxamidoethyl) acrylamide or acrylamide dimer crystallized out. The product was filtered, washed with dioxane, ether and then dried under vacuum.

Yield: 90 g. = 30 percent of theoretical M.P. 289.4°–293.0° F. (143°–145° C.); after recrystallization, 293.0°–298.4° F. (145°–148° C.).

$C_6H_{10}N_2O_2$ % N $\diagdown$ Calculated 19.71%
Found 19.51%

(double bond content = 98.5%)

Osmometric molecular weight (determined by means of a vapor pressure osmometer) = 140.5; (theory 142.1).

The infrared spectrum of the product had the following characteristics: absorption at 950 and 980 cm.$^{-1}$, attributable to the double bond; absorption at 1555 cm.$^{-1}$, characteristic of the second band of the secondary amides; absorption at 1635 cm.$^{-1}$, characteristic of the second band of the primary amides, and finally absorption at 3300 cm.$^{-1}$ in the NH-stretching zone.

EXAMPLE 2

In a 1-liter, one-necked flask, 200 g. of freshly crystallized from chloroform and thoroughly dry acrylamide, and 1600 ml. of dioxane, dried on $CaCl_2$ and distilled on potassium benzophenone are introduced. To the solution, vigorously stirred by means of an electromagnetic stirrer, there are added, under an atmosphere of pure, dry nitrogen, 25 ml. of a 1.6 M solution of butyllithium in hexane. The flask is thoroughly plugged, the contents thereof is left standing for 24 hours, while stirring from time to time.

The solid which separates is filtered off, washed with little dioxane and ether and then dried.

Yield = 160 G; $\eta sp/c$ = 0.027 for a 1 percent solution in 1M $NaNO_3$ at 86° F. (30° C.).

90 g. of the product thus obtained were repeatedly extracted with boiling dioxane; the extracts were combined, concentrated at 86.0° F. (30° C.), 20 mm Hg, to small volume, and the product which separated was filtered off and recrystallized from dioxane, obtaining thereby 47.2 g. (yield 42 percent, calculated on the starting acrylamide) of N-(2-carboxamidoethyl acrylamide, having a M.P. = 298.4° F. (148° C.).

The residue, after extraction of the dimer, had a $\eta$ sp/c = 0.080, measured on a 1 percent solution in 1M $NaNO_3$ at 86° F. (30° C.).

EXAMPLE 3

In this example the procedure of Example 2 was repeated, but with the butyllithium replaced with an equivalent amount of lithium benzophenone in dioxane.

Yield of dimer: 40 percent.

EXAMPLE 4

In this example the procedure of Example 2 was repeated, but with the butyllithium replaced with an equivalent amount of lithium-naphthalene in tetrahydrofuran, extending the reaction time to 36 hours.

Yield of dimer: 38.5 percent.

EXAMPLE 5

In a 1-liter quartz flask provided with stirrer and nitrogen inlet and outlet tubes 40 g. of N-(2-carboxamidoethyl) acrylamide and 400 ml. of dry methanol were introduced. The solution was degassed under vacuum. Then 0.04 g. of alpha, alpha'-azo-bis-isobutyronitrile was added, and the solution was exposed for 4 hours to ultra-violet radiation. After decanting off the methanol the polymer, which had separated as a soft, sticky mass, was dissolved in 200 ml. of water, the solution was saturated with acetone and the polymer was recovered by precipitation in acetone. The precipitate was filtered, washed with acetone and dried.

Yield: 38 g. = 95 percent of theoretical of a white powder, readily soluble in water having a $[\eta] = 0.62$ dl/g in 1M $NaNO_3$ at 86.0° F. (30° C.).

$(C_6H_{10}N_2O_2)_x$ %N $\diagdown$ Calculated 19.71%
Found 19.02%

EXAMPLE 6

In a flask, provided with a condenser, mechanical stirrer and nitrogen inlet and outlet tubes, 42.6 g. of N-(2-carboxamidoethyl) acrylamide, 25.8 g. of distilled vinyl acetate and 684 ml. of dry methanol were introduced. The mixture was refluxed for 5 minutes, 1 percent of benzoyl peroxide was then added and the mixture was refluxed for an additional 4 hours. The flask was cooled in ice, the methanol was decanted off and the polymer which had separated was washed with methanol, then with ether, and dried under vacuum.

Yield: 40 g. = 58.5 percent, %N = 16.48

EXAMPLE 7

Into a flask provided with reflux condenser and mechanical stirrer, 7 g. of N-(2-carboxamidoethyl) acrylamide and 1 ml. of distilled ethyl acrylate in 125 ml. of methanol were charged. The solution was refluxed for 5 minutes, 0.1 g. of alpha,alpha'-azo-bis-isobutyronitrile were added, the mixture was again refluxed for 6 hours, then cooled and the methanol was removed by decantation. The polymer which had separated was collected, dissolved in 8 ml. of $H_2O$ and 4 ml. of acetone and the solution was precipitated in a 1:1 acetone-methanol mixture. The precipitate was washed three times with acetone and dried under vacuum.

Yield: 6 g. of water soluble product
N content = 16.31 percent.

What is claimed is:

1. A process for preparing N-(2-carboxamidoethyl) acrylamide in high yield which comprises reacting acrylamide under substantially anhydrous conditions in the presence of an organo metallic catalyst which is an alkali metallo-alkyl, an alkali metallo-aryl or a complex of a complexible ketone with an alkali metal.

2. The process of claim 1 wherein said catalyst is present in an amount of from 0.005 to 0.05 moles per mole of acrylamide.

3. The process of claim 1 in which said reaction is conducted at a temperature from 0° to 100° C. in an inert organic solvent.

4. The process of claim 3 in which said reaction is conducted until a yield of at least about 30 percent of N-(2-carboxamidoethyl) acrylamide is attained.

5. The process of claim 3 in which said inert organic solvent is an ether.

6. The process of claim 3 in which said inert organic solvent is dioxane.

7. The process of claim 1 in which said organometallic compound is n-butyllithium.

8. The process of claim 1 in which said organometallic compound is lithium-benzophenone.

9. The process of claim 1 in which said organometallic compound is lithium-naphthalene.

10. A process for preparing N-(2-carboxamidoethyl) acrylamide in high yield which comprises reacting acrylamide under substantially anhydrous conditions in an inert solvent at a temperature of from 0° to 100° C. in the presence of from 0.005 to 0.05 moles per mole of acrylamide of a catalyst which is an alkali metallo-alkyl, an alkali metallo-aryl or a complex of a complexible ketone with an alkali metal.

11. A process for preparing N-(2-carboxamidoethyl) acrylamide in high yield which comprises reacting acrylamide under substantially anhydrous conditions in an inert solvent at about room temperature in the presence of an organo metallic catalyst which is an alkali metallo-alkyl, an alkali metallo-aryl, or a complex of a complexible ketone with an alkali metal.

12. The process of claim 11 wherein said catalyst is butyl lithium, lithium-naphthalene, or the complex of benzophenone with lithium or potassium.

* * * * *